(12) United States Patent
Kasiolas et al.

(10) Patent No.: US 12,506,743 B1
(45) Date of Patent: Dec. 23, 2025

(54) DECENTRALIZED USER AUTHORIZATION

(71) Applicant: CALM.COM, INC., Palo Alto, CA (US)

(72) Inventors: Anastasios Kasiolas, Miami, FL (US); Byamba Tumurkhuu, Maplewood, MN (US); Shreyas Purohit, San Mateo, CA (US)

(73) Assignee: CALM.COM, INC., Palo Alto, CA (US)

( * ) Notice: Subject to any disclaimer, the term of this patent is extended or adjusted under 35 U.S.C. 154(b) by 0 days.

(21) Appl. No.: 18/961,308

(22) Filed: Nov. 26, 2024

(51) Int. Cl.
*H04L 9/40* (2022.01)
*G06F 21/62* (2013.01)

(52) U.S. Cl.
CPC ........ *H04L 63/105* (2013.01); *G06F 21/6218* (2013.01)

(58) Field of Classification Search
CPC ............................ H04L 63/105; G06F 21/6218
See application file for complete search history.

(56) References Cited

U.S. PATENT DOCUMENTS

| | | | | |
|---|---|---|---|---|
| 10,853,548 B1* | 12/2020 | Goodsitt | ............... | G06F 30/347 |
| 10,862,880 B1* | 12/2020 | Massicotte | .......... | H04L 63/1466 |
| 11,626,996 B2* | 4/2023 | Campagna | ............ | H04L 9/0822 |
| | | | | 713/168 |
| 11,954,238 B1* | 4/2024 | Tan | ....................... | H04L 9/0891 |
| 12,002,055 B1* | 6/2024 | Miller | ................ | G06Q 20/4016 |
| 2007/0136794 A1* | 6/2007 | Chin | ....................... | H04L 63/08 |
| | | | | 726/5 |
| 2010/0262635 A1* | 10/2010 | Hambleton | ........ | G06Q 30/0222 |
| | | | | 707/812 |
| 2016/0028737 A1* | 1/2016 | Srinivasan | .......... | H04L 63/0807 |
| | | | | 726/4 |
| 2016/0259936 A1* | 9/2016 | Mukherjee | ............ | H04L 63/061 |
| 2017/0220793 A1* | 8/2017 | Birgisson | ................ | G06F 21/62 |
| 2019/0230081 A1* | 7/2019 | Singh | ...................... | H04L 63/10 |
| 2019/0286832 A1* | 9/2019 | Szeto | ................... | H04W 12/082 |
| 2019/0325133 A1* | 10/2019 | Goodridge | ............ | G06F 21/604 |
| 2020/0084209 A1* | 3/2020 | Kram | ................... | H04L 63/0876 |
| 2021/0409400 A1* | 12/2021 | Palanisamy | ............. | H04L 67/12 |
| 2022/0109988 A1* | 4/2022 | Kotay | .................... | H04W 76/18 |
| 2022/0150066 A1* | 5/2022 | Sugarev | ................ | H04L 9/3247 |
| 2022/0417014 A1* | 12/2022 | Basu | ....................... | H04L 67/02 |
| 2023/0153449 A1* | 5/2023 | Li | ........................ | G06F 21/6218 |
| | | | | 726/4 |

(Continued)

*Primary Examiner* — Jason Chiang
(74) *Attorney, Agent, or Firm* — Fenwick & West LLP

(57) ABSTRACT

A system receives a request for a user authorization token for a user by a client device. The system generates the user authorization token using a configuration file that has a version identifier and specifies user permissions to access data in a set of data classes. The system transmits the user authorization token to the client device. The system receives a request to perform an action on data in a data class. The request includes the user authorization token including indicia of the version identifier. The system determines whether the user authorization token is invalid based on the version identifier of the user authorization token and determines whether the user has permissions to perform the action on the data in the data class based on the user authorization token. The system allows or disallows the request to perform the action on the data in the data class.

18 Claims, 6 Drawing Sheets

(56) References Cited

U.S. PATENT DOCUMENTS

| | | | |
|---|---|---|---|
| 2023/0199497 A1* | 6/2023 | Krishan | H04L 63/0281 |
| | | | 726/12 |
| 2023/0396602 A1* | 12/2023 | Wu | H04W 12/009 |
| 2024/0020400 A1* | 1/2024 | Chen | G06F 21/6227 |
| 2024/0048563 A1* | 2/2024 | Yin | H04L 63/102 |
| 2024/0112132 A1* | 4/2024 | Sreekumar | H04L 65/1104 |
| 2024/0297789 A1* | 9/2024 | Gottfrid | H04L 63/0861 |
| 2024/0396884 A1* | 11/2024 | Lin | H04L 63/0807 |
| 2025/0023878 A1* | 1/2025 | Sathaye | H04L 63/083 |

\* cited by examiner

DECENTRALIZED USER AUTHORIZATION

TECHNICAL FIELD

The disclosed embodiments generally relate to the field of user authorization, and in particular to systems and methods for decentralized user authorization.

BACKGROUND

Data systems often manage large amounts of data for users to access and interact with. For example, a data system may allow its users to create data, read data, delete data, etc. Not all data in a data system may be accessed by all users. For instance, some data may contain sensitive information that is inaccessible to all users, such as documents containing personal health information (PHI) or personal identification information (PII). Data systems control data access to ensure that only users with permission to access the data are allowed access. They may issue authorization tokens that define the scope and duration of a user's access to data and allow for determination of whether a user has data access through validation of the token.

However, data systems that use authorization tokens to determine whether users have access to data are unable to quickly invalidate tokens, for example in cases when an authorization token is no longer desired or needed or when an authorization token is leaked. Data systems are often required to wait until the authorization token's expiry that is decided at token generation, for example a period of 24 hours.

Additionally, data systems that control access to data through the issuance and validation of authorization tokens typically rely on a central authority to receive and process requests for actions. Systems that handle a large number of requests with a central authority may be unable to quickly validate those requests.

SUMMARY

A system hosts and controls access to data managed by one or more microservices. A microservice is a service that manages one or more domains of data stored in a database and exposes APIs for client applications to access that data. The system generates user authorization tokens that define the scope and duration of a user's access to data in each microservice. The system generates the user authorization tokens using a configuration file that includes a version identifier. When a user requests to perform an action on data, the system receives the request along with the user authorization token. The user authorization token includes indicia of the version identifier from the configuration file used to generate it. To determine whether the token is valid, the system compares the version identifier of the user authorization token to a current version identifier stored by a configuration server.

To invalidate the user authorization token, the system may change the version identifier of the version of the configuration file stored by the configuration server. As the system validates user authorization tokens based on the version identifier, a change to the version identifier of the configuration file stored by the configuration server effectively renders all previously generated user authorization tokens invalid. This allows the system to act quickly in the event that user authorization tokens are leaked and invalidate tokens before the end of their expiry period.

The system may validate the user authorization token at the microservice level, for example using a server associated with the microservice that manages the data. By controlling data access at a microservice level, the need to consult a central authority on every request is removed. Servers associated with each microservice can control access to data of a limited set of domains rather than to data of all domains. This implementation provides a technical improvement in that it reduces the load each server receives, allowing the system to process requests in parallel, at a higher rate. The implementation further allows for easy data isolation, as the data of each domain may be managed separately.

In some embodiments, the system receives a request for a user authorization token for a user by a client device. The system generates the user authorization token using a configuration file. The configuration file has a version identifier and specifies, for each of a plurality of roles including the role of the user, permissions describing actions the user has permission to perform on data in a set of data classes. The system transmits the generated user authorization token to the client device. The token includes indicia of the version identifier and permissions corresponding to the role of the user. The system receives a request to perform an action on data in a data class from the client device. The request includes the user authorization token. The system determines whether the user authorization token is invalid by validating the token signature first and subsequently by determining whether the user authorization token is expired and whether the version identifier indicated by the user authorization token is a current version identifier. In response to determining that the user authorization token is not invalid, the system determines whether the user has permissions to perform the action on the data in the data class based on the user authorization token. In response to determining that the user has permissions to perform the action on the data in the data class, the system allows the request to perform the action on the data in the data class.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes a system that hosts and controls access to data managed by one or more microservices. A microservice is a backend application that manages one or more domains of data stored in a database and exposes APIs for client applications to access that data. For example, a microservice may manage a "poll" domain and allow client applications to make API calls to perform actions on data in the poll domain, such as read polls, delete polls, etc. Each domain is managed by one microservice, though one microservice may manage multiple domains. For example, a first microservice may manage the "poll" domain and a second microservice may manage a "documents" domain and a "workflow" domain. Each domain contains data of a unique data class. For example, data of the "documents" domain is of a first data class while data of the "workflow" domain is of a second data class different from the first data class. In some embodiments, each microservice stores data of the one or more domains it manages. Systems and methods for controlling access to data managed by microservices are described with respect to FIGS. 1-6.

Figure 1:
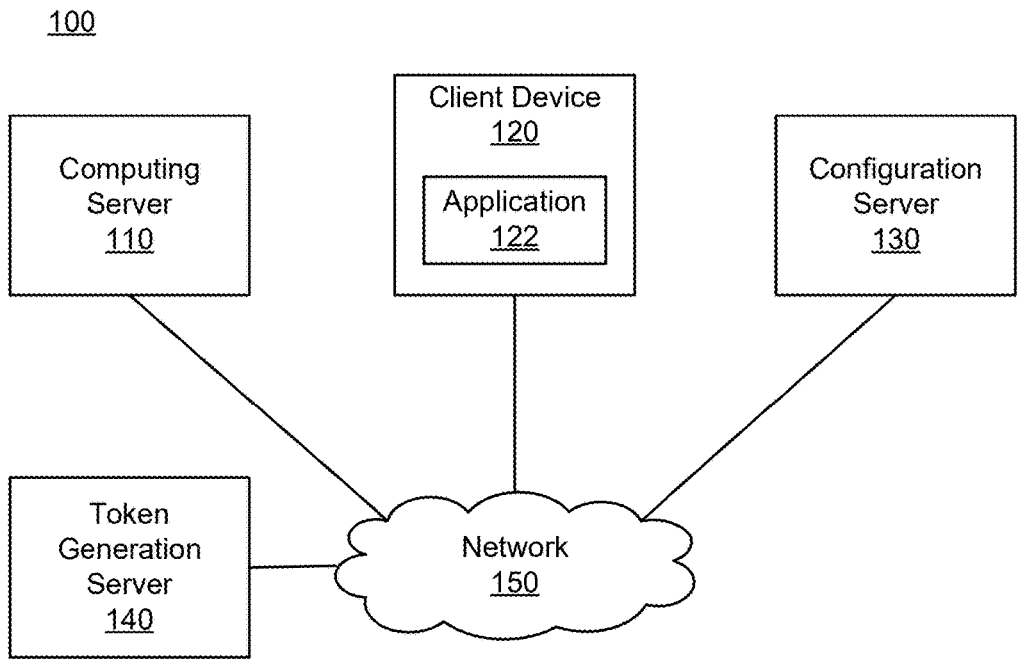
FIG. 1 illustrates one embodiment of a system that hosts and controls access to data managed by one or more microservices, in accordance with some embodiments.

Figure (FIG. 1 is a block diagram that illustrates a system environment 100 for controlling access to one or more microservices, in accordance with some embodiments. The system environment 100 includes a computing server 110, a client device 120, a configuration server 130, and a token generation server 140. The entities and components in the system environment 100 communicate with each other through a network 150. In various embodiments, the system environment 100 includes fewer or additional components. In some embodiments, the system environment 100 also includes different components. While each of the components in the system environment 100 is described in a singular form, the system environment 100 may include one or more of each of the components.

The computing server 110 controls access to data managed by one or more microservices by validating user authorization tokens. A user authorization token is a token associated with a user that defines the scope and duration of a user's access to data. The user authorization token may include information on when the token was created, an expiry time of the token (e.g., 3:30:00 pm EST), and a period for which the token is valid (e.g., 24 hours). The user authorization token may include information on user permissions: data classes that the user may access and the ways in which the user may access such data classes or actions the user may take on data in such data classes. Example permissions include create, read, update, soft delete, and hard delete permissions. As an example, a user may have read permissions for data in a workflow data class, allowing the user to read the data in the workflow data class, but may not have create, update, soft delete, or hard delete permissions for data in the workflow data class. The same user may have create ("c"), read ("r"), update ("u"), soft delete ("d"), and hard delete ("e") permissions for a different data class, for example the poll data class. User permissions may be associated with a role of the user. A user's role defines a collection of permissions that apply to the user. Users with the same role have the same permissions. For example, users with the role "therapist" may have read permissions for a documents data class while users with the role "recipient" may have create, read, update, soft delete, and hard delete permissions for the documents data class.

Figure 3A:
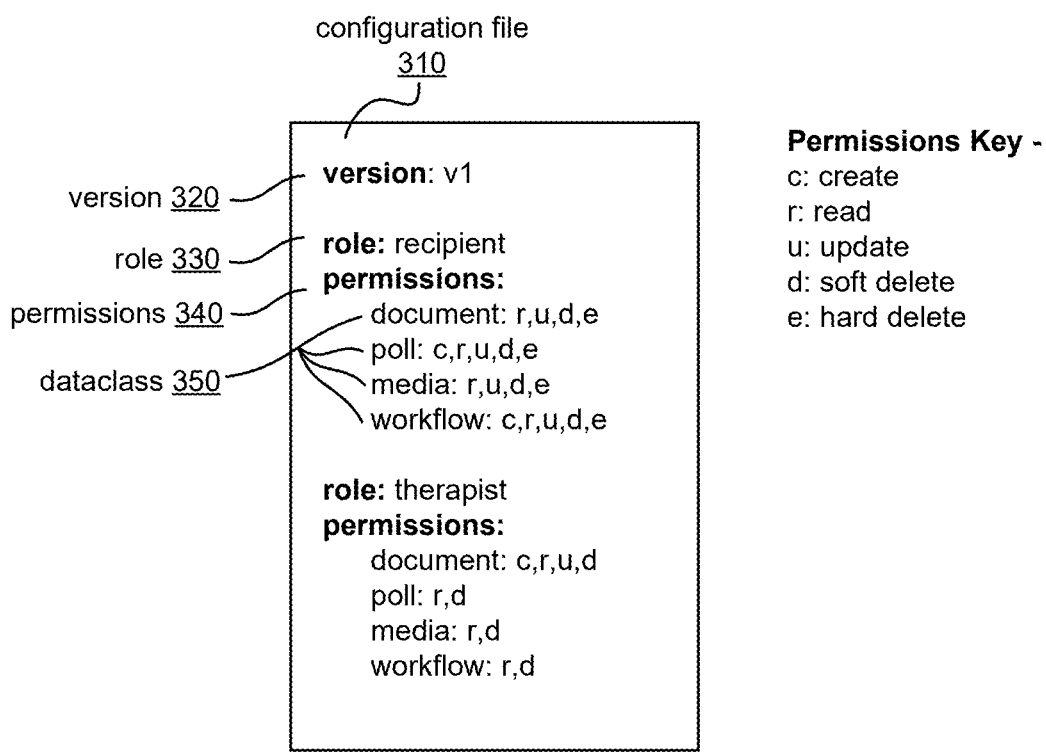
FIGS. 3A and 3B illustrate example configuration files, in accordance with some embodiments.
Figure 3B:
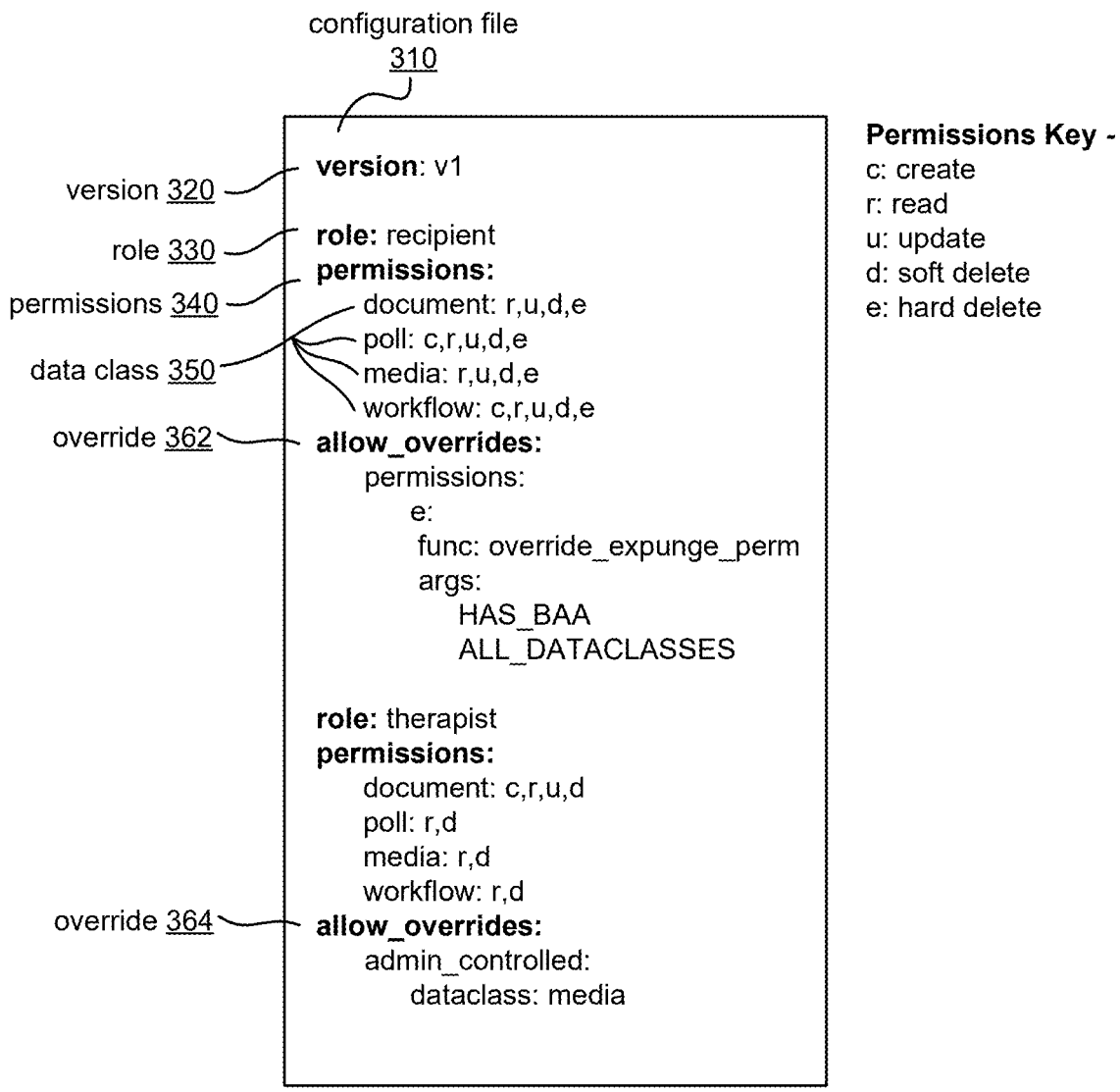

In some embodiments, permissions may be overridden. Permissions may be overridden on a per user, per data class basis. An override may grant additional permissions. For example, an override may allow a particular user to hard delete data in the poll data class when they otherwise would be unable to, given their role. An override may remove permissions. For example, an override may disallow a particular user from performing an action, even if the user's role would otherwise allow the user to perform the action. An override may set permissions for a user or data class to empty, signifying that there is no authorization of any kind for the user or data class. Overrides may be one of two types: admin-controlled, or function-controlled. Admin-controlled overrides are applied to users or data classes using an admin tool. In some embodiments, the format of an admin-controlled override is a comma separated list of permissions that replaces the previous permissions of the user or data class. For example, if permissions for the poll data class are "c, r, u, d" and the admin-controlled override is "r, d," then the permissions for the poll data class are "r, d." Function-controlled overrides are applied to users or data classes using a predefined function that has access to the user state. The function takes in a list of arguments and determines, based on the arguments and the function's implementation logic, whether the permissions for the user or data class should be overridden. Both admin-controlled overrides and function-controlled overrides may be included in a configuration file and are illustrated in FIG. 3B. When the computing server 110 receives, from a client device 120, a request to access data, the computing server 110 determines whether to allow the request based on a user authorization token provided by the client device 120. The computing server 110 may allow the request, allowing the user to access data or perform a requested action, or may disallow the request.

In some embodiments, the computing server 110 may be implemented in a distributed manner, such that access to data managed by each microservice is controlled separately. For example, a first instance of the computing server 110 may control access to data managed by a documents microservice and a second instance of the computing server 110 may control access to data managed by a media microservice. When a request to perform an action on the documents data class is received (e.g., delete a document), the first instance of the computing server 110 processes and responds to the request. Likewise, when a request to perform an action on the media data class is received, the second instance of the computing server 110 processes and responds to the request. By controlling data access in a distributed manner, at a microservice level, the need to consult a central authority on every request is removed. Instances of the computing server 110 can control access to data of one data class rather than controlling access to data of all data classes. This implementation provides a technical improvement in that it reduces the load each instance of the computing server 110 receives, allowing each instance to process requests at a higher rate. Moreover, the implementation allows for easy data isolation, as the data of each data class is managed separately. Further details of the computing server 110 are described with respect to FIG. 2.

A client device 120 is a computing device that belongs to a user of the computing server 110. The user uses the client device 120 to communicate with the computing server 110 and perform various data management related tasks such as creating data, reading data, updating data, deleting data, etc. The user of the client device 120 may be a consumer, a manager, an accounting administrator, or a general employee of an organization. A user may be any natural person or a robotic agent. A user may be referred to as an organization or its representative, such as its employee. The client device 120 may be any computing device. Examples of such client devices 120 include personal computers (PC), desktop computers, laptop computers, tablets (e.g., iPad), smartphones, wearable electronic devices such as smartwatches, or any other suitable electronic devices. The client device 120 may include an application 122 that the user of the client device 120 may use to interact with content of the computing server 110. For example, the user may have an account associated with the application 122 and may log in to the account in order to access data of the computing server 110.

The configuration server 130 stores and maintains a configuration file. The configuration file defines a set of permissions that are granted to each role, for every data class. Example configuration files are shown in FIGS. 3A and 3B. The configuration server 130 may change the configuration file. Thus, the configuration file includes a version identifier that defines the version of the configuration file. Different versions of the configuration file have different version identifiers. The configuration server 130 provides a current version of the configuration file to the token generation server 140 to use in the generation of user authorization tokens and to the computing server 110 to use in the validation of user authorization tokens. In some embodiments, the configuration server 130 may receive an updated version of the configuration file from the computing server 110. In these embodiments, the configuration server 130 may use the updated version of the configuration file as the current version of the configuration file.

The token generation server 140 generates user authorization tokens for users of the client device 120. In some embodiments, the token generation server 140 generates a user authorization token for a user in response to receiving a request from the client device 120 associated with the user. For example, the token generation server 140 may receive a request from the client device 120 to generate a user authorization token in response to the user logging into an application. In another example, the token generation server 140 may receive a request to generate a token from the client device 120 in response to the user making a request to perform an action on data, such as creating or reading data. The request may be an API call. In some embodiments, the token generation engine 210 generates a user authorization token in response to the expiry of an existing user authorization token associated with the user.

The token generation server 140 generates a user authorization token using a configuration file and a user state or cohort. The configuration file defines a set of permissions that are granted to each role, for every data class. The user state includes information about a particular user for which the token generation server 140 generates the user authorization token. For example, the user state may include one or more roles held by the user. The token generation server 140 pulls a current version of the configuration file from the configuration server 130 and uses the current version of the configuration file in combination with the user state to generate the user authorization token. The token generation server 140 may also generate the user authorization token to have an expiry time: a time or period after which the user authorization token is no longer valid. For example, the token generation server 140 may generate the user authorization token to expire after 24 hours, or at 12:00:00 am EST each day.

In some embodiments, the token generation server 140 generates the user authorization token as a JSON Web Token (JWT). A JWT has a standard format, including a header, a payload, and a signature. The header includes the type of token (i.e., JWT) and signing algorithm. The payload includes claims that the token transmits. There are three categories of claims: registered claims, public claims, and private claims. Registered claims are pre-established and publicly documented. Example registered claims include an issuer claim ("iss") indicating an application that issued the JWT, a subject claim ("sub") indicating the user subject of the JWT, an audience claim ("aud") indicating an application the JWT is intended for, an expiration time claim ("exp") indicating a time until the JWT can be accepted, a not before claim ("nbf") indicating a time at which the JWT can start being accepted, an issued at claim ("iat") indicating a time when the JWT was issued, and a JWT ID Claim ("jti") indicating the identity of the individual JWT. Public and private claims are custom claims that define information different from the registered claims. The token generation server 140 may generate the JWT token to include registered claims as well as custom claims. For example, the token generation server 140 may generate the user authorization token as a JWT token including registered claims as well as custom claims defining a version of the token, a cohort, features enabled for the cohort, a role of the user, data classes, and permissions for each data class. A cohort is a group of users that can inherit one or more roles. A feature defines a mapping between data classes and microservices.

The token generation server 140 provides the generated user authorization token to the user, through the client device 120. The client device 120 receives the user authorization token from the token generation server 140. When the user wishes to perform an action on data of a data class, the client device 120 provides the generated user authorization token to the computing server 110 along with a request to perform the action.

The functionality of the computing server 110, configuration server 130, or the token generation server 140 may be implemented in full or in part by any of the other components of the system environment 100 (e.g., the computing server 110, the configuration server 130, the token generation server 140). For example, the computing server 110 may implement the functionality of the token generation server 140, or the configuration server 130 may perform actions of the computing server 110. Moreover, though shown as separate servers in FIG. 1, the computing server 110, the configuration server 130, and the token generation server 140 may be combined in any combination. For example, the computing server 110 and the token generation server 140 may be implemented as one server rather than as separate servers. In some embodiments, the components of the system environment 100 may be external servers operated by third-parties. For example, the token generation server 140 may be a third-party token generation service.

The network 150 provides connections to the components of the system environment 100 through one or more sub-networks, which may include any combination of local area and/or wide area networks, using both wired and/or wireless communication systems. In some embodiments, a network 150 uses standard communications technologies and/or protocols. For example, a network 150 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 150 may be represented using any suitable format, such as hypertext markup language (HTML), extensible markup language (XML), JavaScript object notation (JSON), structured query language (SQL). In some embodiments, some of the communication links of a network 150 may be encrypted using any suitable technique or techniques such as secure sockets layer (SSL), transport layer security (TLS), virtual private networks (VPNs), Internet Protocol security (IPsec), etc. The network 150 also includes links and packet switching networks such as the Internet. In some embodiments, a data store belongs to part of the internal computing system of a server (e.g., the database 290 may be part of the computing server 110). In such cases, the network 150 may be a local network that enables the server to communicate with the rest of the components.

Example Server Components

Figure 2:
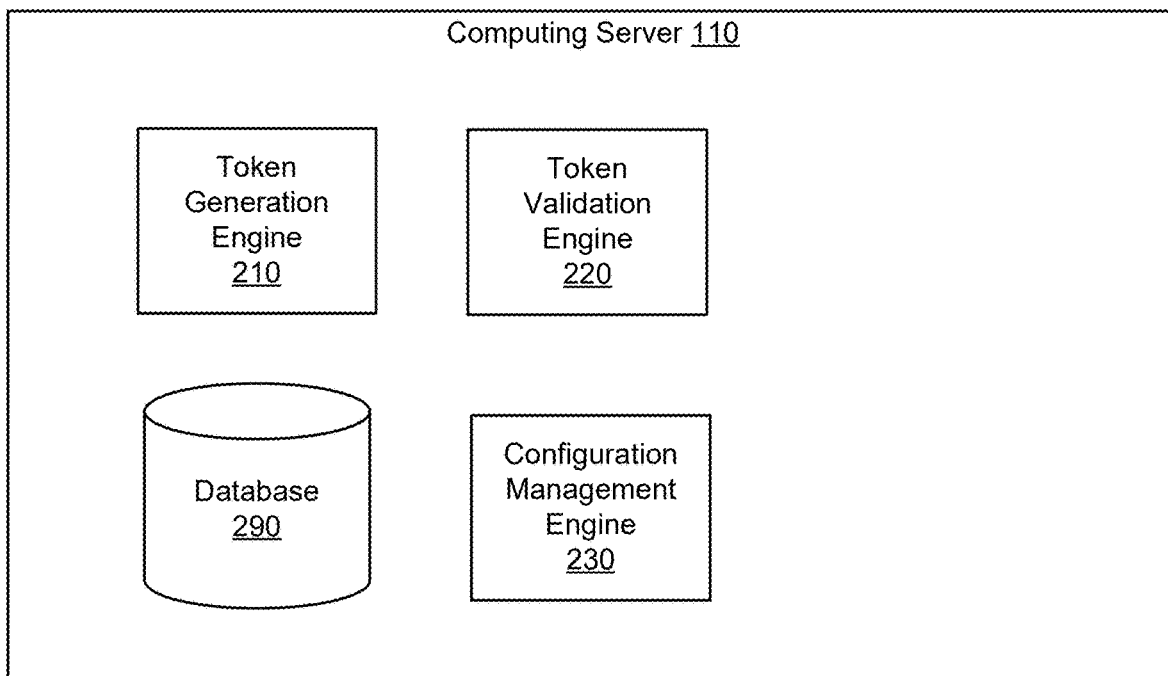
FIG. 2 is a block diagram illustrating components of a computing server, in accordance with some embodiments.

FIG. 2 is a block diagram illustrating components of computing server 110, in accordance with some embodiments. In some embodiments, the computing server 110 includes a token validation engine 220, a configuration management engine 230, and a database 290. In various embodiments, the computing server 110 may include fewer or additional components. The computing server 110 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The token validation engine 220 determines, based on a user authorization token, whether a user may perform an action on data in a domain. In some embodiments, the token validation engine 220 receives a user authorization token from the client device 120 of a user. For example, when a user attempts to perform an action on data in a domain (e.g., read a file in the workflow data class), the client device 120 of the user makes a request (e.g., API call) to the computing server 110 to perform the action. The token validation engine 220 receives the request from the client device 120, the request including the user authorization token. To determine whether the user may perform the action on data in the domain, the token validation engine 220 determines the validity of the user authorization token and determines whether the user has permissions to perform the action.

The token validation engine 220 determines whether the user authorization token is invalid. In some embodiments, the token validation engine 220 performs standard JWT token validation. Standard JWT token validation includes validating fields of the token such as the token signature, the token issuer, the token audience, the token permissions, and the token expiration. For example, to validate the token expiration, the token validation engine 220 may check the expiry time of the token against the current time. The current time is the time at which the token validation engine 220 determines whether the user authorization token is invalid. If the expiry time of the token were 12:00:00 am EST and the current time were 12:00:01 am EST, the token validation engine 220 would determine that the token is expired, thus the token is invalid. In some embodiments, the token validation engine 220 determines the validity of the user authorization token based on the format of the user authorization token. For example, if the format of the user authorization token is incorrect, the token validation engine 220 determines that the user authorization token is invalid.

In some embodiments, the token validation engine 220 determines whether the user authorization token is invalid based on the version identifier of the authorization token. As described with respect to the token generation server 140, the version identifier defines the version of the configuration file used to generate the user authorization token. The configuration server 130 maintains a current version of the configuration file, including a current version identifier. To determine whether the user authorization token is invalid, the token validation engine 220 determines whether the version identifier of the user authorization token is different from the current version identifier maintained by the configuration server 130. If the version identifier of the user authorization token is not the same as the current version identifier, for example the version identifier of the user authorization token is "v1" and the current version identifier is "v2, the token validation engine 220 determines that the token is invalid.

Figure 4:
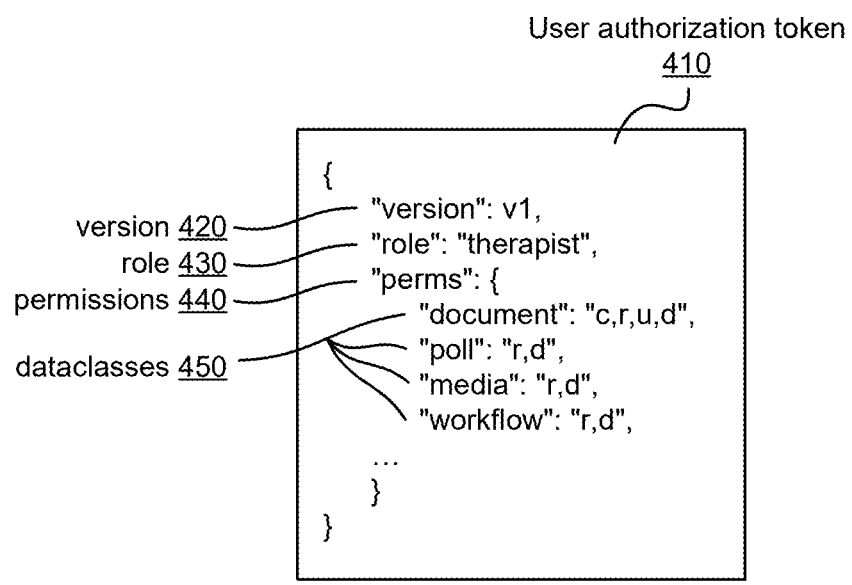
FIG. 4 illustrates an example user authorization token, according to some embodiments.

The token validation engine 220 determines whether the user has permissions to perform the action on the data of the data class. For example, the token validation engine 220 may determine whether the user may update data of the poll data class. The token validation engine 220 determines whether the user has permissions to perform the action based on the authorization token. As described with respect to the token generation server 140, the user authorization token includes information on user permissions. FIG. 4 shows an example user authorization token that defines user permissions. Validating the token permissions may be a part of standard JWT validation procedure.

The token validation engine 220, in response to validating the user authorization token and determining that the user has permissions to perform the action, allows the user to perform the action. That is, the token validation engine 220 allows the request from the client device 120 to perform the action. In response to either determining that the user authorization token is invalid or determining that the user does not have permissions to perform the action, the token validation engine 220 disallows the user to perform the action. That is, the token validation engine 220 denies the request from the client device 120 to perform the action.

In some embodiments, the token validation engine 220 may manage a cache. The cache stores user authorization tokens that the token validation engine 220 has determined to be valid and have the correct permissions for performing an action. Before determining whether the user authorization token is invalid and whether the user has the correct permissions, the token validation engine 220 checks if the user authorization token is stored in the cache. If the user authorization token is not stored in the cache, the token validation engine 220 determines whether the user authorization token is valid and whether the user has permissions to perform the action. In response to determining that the user authorization token is not invalid and that the user has permissions to perform the action, the token validation engine 220 allows the user to perform the action and stores the user authorization token in the cache. If the user authorization token is stored in the cache, the token validation engine 220 determines that the user authorization token is not invalid and that the user may perform the action. In this scenario, the token validation engine 220 avoids having to validate the user authorization token a second time, after it has already been validated. Similarly, the token validation engine 220 avoids having to check that the user has permissions to perform the action, as the token validation engine 220 has already checked. By caching user authorization tokens, the token validation engine 220 is able to respond to requests faster and reduces the computational resources required to respond to requests.

The configuration management engine 230 manages the configuration file. The configuration management engine 230 may change the information in the configuration file, such as the version identifier, roles, data classes, or permissions. For example, the configuration management engine 230 may add a new role "admin" that has all permissions for each of the data classes. Similarly, the configuration management engine 230 may add a new data class to the configuration file to describe permissions for a new domain.

The configuration management engine 230 may update the version identifier of the configuration file. Updates to the version identifier are such that version identifiers are strictly increasing with time. For example, a version identifier "v1" indicates a version of the configuration file that existed before a version of the configuration file with identifier "v2." In some embodiments, the configuration management engine 230 updates the version identifier of the configuration file in response to changing the configuration file, for example changing roles, data classes, or permissions. The configuration management engine 230 may update the version identifier of the configuration file automatically in response to making or detecting a change in the configuration file. The configuration management engine 230 may update the version identifier of the configuration file even when no substantive change is made to the configuration file (e.g., no change is made to the roles, data classes, or permissions). The configuration management engine 230 pushes the updated version of the configuration file (including the updated version identifier) to the configuration server 130, to use as the current version of the configuration file. The next time the token generation engine 210 pulls the configuration file from the configuration server 130, it pulls the updated configuration file.

In some embodiments, the configuration management engine 230 updates the version identifier of the configuration file to invalidate user authorization tokens. For example, the configuration management engine 230 may determine that a user authorization token has been leaked and update the version identifier of the configuration file. In updating the version identifier of the configuration file, the configuration management engine 230 renders all previously issued user authorization tokens (tokens with lower version identifiers) invalid. That is, when the token validation engine 220 attempts to validate a previously issued user authorization token, the token validation engine 220 determines that the version identifier of the previously issued user authorization token is different from the current version identifier maintained by the configuration server 130.

In some embodiments, the configuration server 130 may fully or partially perform the actions described with respect to the configuration management engine 230 of the computing server. For example, the configuration server 130 may make changes to the current version of the configuration file. In some embodiments, the computing server 110 may store the configuration file in the database 290 of the computing server 110 rather than at the configuration server 130.

Example Configuration File and Authorization Token

FIGS. 3A and 3B show two examples of configuration files 310. FIG. 3A shows an example configuration file without overrides. The configuration file 310 defines a set of permissions 340 for each of two roles 330, a recipient role and a therapist role. For the role 330 of therapist, the configuration file 310 defines the permissions 340 for the document, poll, media, and workflow data classes 350. For example, for the role 330 of recipient, the permissions 340 for the document data class 350 are r, u, d, e (read, update, soft delete, and hard delete). The configuration file also defines a version identifier 320. The version identifier defines the version of the configuration file that the token generation server 140 uses to generate the user authorization token (i.e., the "current version" at the time of generating the user authorization token). In some embodiments, the configuration file may have additional or different components from the configuration file 310, for example including overrides for a particular user.

FIG. 3B shows an example configuration file that includes overrides. That is, in addition to defining the version 320, role 330, permissions 340, and data class 350, the configuration file 310 includes overrides 362 and 364. Override 362 is a function-controlled override that takes the form of a predefined function "override_expunge_perm" that takes arguments "HAS_BAA and ALL_DATACLASSES." When the token generation server 140 generates a token using the configuration file 310, the token generation server 140 may execute the function using the arguments to determine whether the permissions 340 should be overridden. Override 364 is an admin-controlled override. Override 364 specifies that an admin may use an admin tool to override permissions for the media data class.

FIG. 4 illustrates an example user authorization token, according to some embodiments. The example user authorization token 410 includes a version identifier 420, a role 430 held by the user for which the user authorization token 410 was generated, and permissions 440 granted to the user for a set of data classes 450. The standard industry claims that are present in a token are omitted for simplicity.

The user authorization token 410 may be generated (e.g., by the token generation server 140) based on a user state that defines the user to have a therapist role along with a configuration file like configuration file 310, which defines permissions for the therapist and recipient roles. The version identifier 420 of the user authorization token 410 matches with the version identifier 320 of the configuration file 310, indicating that the token generation server 140 used the configuration file 310 to generate the user authorization token 410. The configuration management engine 230 of the computing server 110 may invalidate the user authorization token 410 by updating the version identifier in the current configuration file from the version 420, "v1," to a new version "v2."

The permissions 440 specify that the user associated with the user authorization token 410 may create, read, update, or soft delete data of the document data class 450 and read or soft delete data of the poll, media, and workflow data classes 450. The token validation engine 220 of the computing server 110 may use the permissions 440 included in the user authorization token 410 to determine what actions the user associated with the user authorization token 410 may perform. For example, the token validation engine 220 may determine that the user does not have permission to update data of the poll data class, as the user only has permission to read and soft delete data of the poll data class. Based on the permissions 440, the token validation engine 220 may allow some actions and disallow other actions. For example, the token validation engine 220 may allow the user to read data of the poll data class 450 but may not allow the user to update data of the poll data class 450.

In some embodiments, the format of the user authorization token may differ from the format of the example user authorization token 410. For example, the user authorization token may be an encrypted token that implicitly includes information on the user state and configuration file. The user authorization token 410 may include a recipient identifier, a cohort, features that are enabled for the cohort, and additional information (e.g., standard JWT claims).

User Authorization Process

Figure 5:
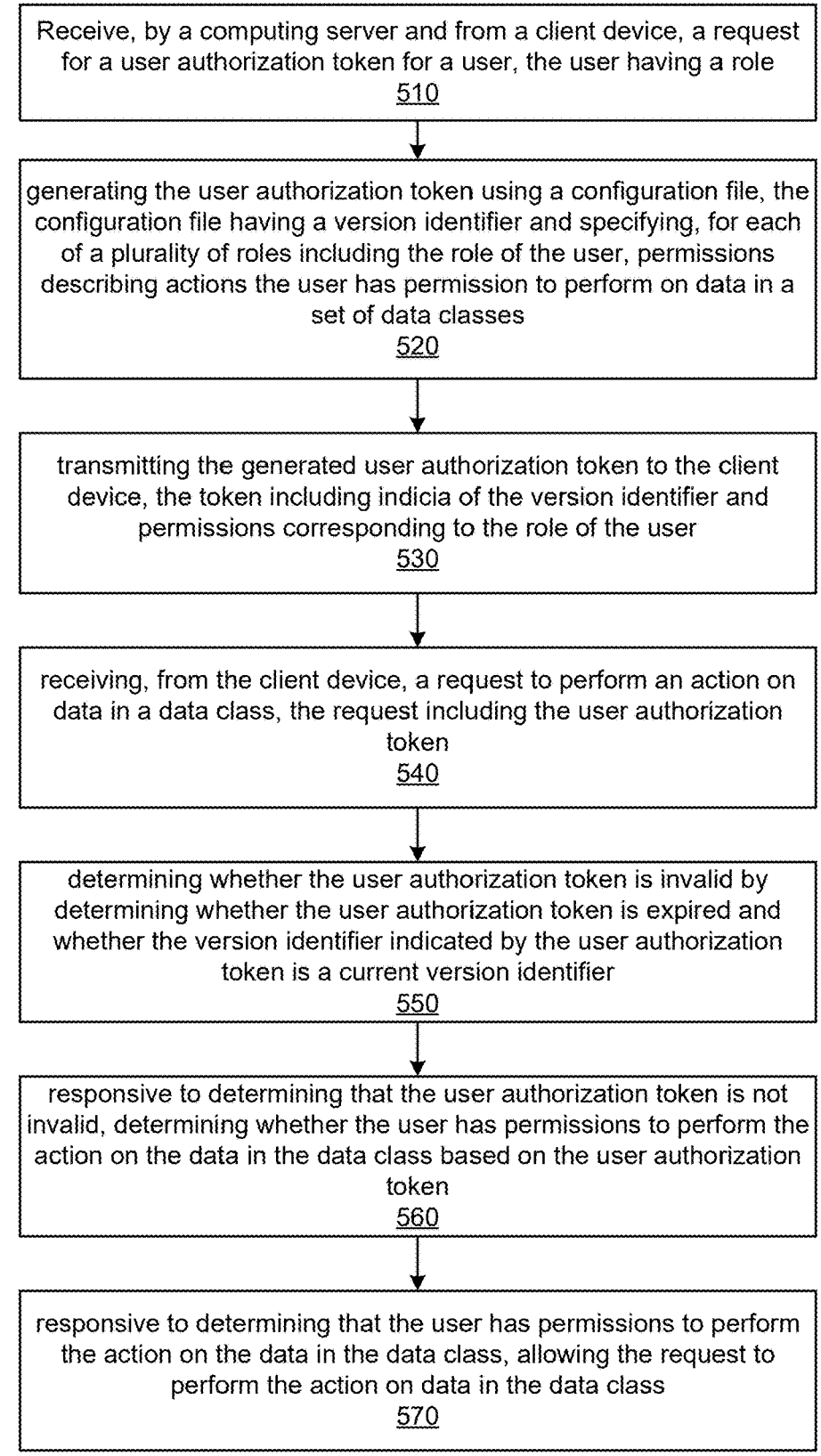
FIG. 5 is a flowchart for a method of a user authorization process, in accordance with some embodiments.

FIG. 5 is a flowchart for a method of a user authorization process, in accordance with some embodiments. While the steps in process 500 are illustrated graphically in FIG. 5 as sequences of steps, some of the steps may occur in different sequences than illustrated or may occur concurrently with other steps. Also, while the process 500 is depicted as a single series, in various embodiments and situations a process may be further broken down into multiple series.

The process 500 begins with the computing server 110 receiving 510 a request for a user authorization token for a user. The computing server 110 may receive the request from a client device 120 associated with a user. The computing server 110 may receive the request in response to the user logging in to an application, in response to the expiry of an existing user authorization token, or in response to receiving a request to perform an action on data, such as reading or updating data. The computing server 110 may receive the request as an API call from the client device 120.

The computing server 110 generates 520 the user authorization token using a configuration file. The configuration file has a version identifier and specifies permissions describing actions that users of different roles have permission to perform on data in a set of data classes. The computing server 110 pulls a current version of the configuration file from the configuration server 130 and uses the current version of the configuration file to generate the user authorization token. The computing server 110 may also use a user state to generate the user authorization token. The user state includes information about the user, such as the user's roles.

The computing server 110 transmits 530 the generated user authorization token to the client of the client device. The user authorization token includes indicia of the version identifier and permissions corresponding to the role of the user. When the computing server 110 receives 540 a request to perform an action on data in a data class, it receives the user authorization token included in the request. The computing server 110 may receive the user authorization token from the client device 120.

The computing server 110 determines 550 whether the user authorization token is invalid by determining whether the user authorization token is expired and whether the version identifier indicated by the user authorization token is a current version identifier. The computing server 110 checks the expiry time of the token against the current time. For example, if the expiry time of the token is 12:00:00 am EST and the current time is 12:00:01 am, the token validation engine 220 determines that the token is expired, thus the token is invalid. The computing server 110 determines whether the version identifier of the user authorization token is different from the current version identifier maintained by the configuration server 130. If the version identifier of the user authorization token is not the same as the current version identifier, for example the version identifier of the user authorization token is "v1" and the current version identifier is "v2, the computing server 110 determines that the token is invalid. The computing server 110 may determine the user authorization token is invalid in other ways, for example by determining if the format of the token is invalid, by determining that the client device 120 that provided the token is a malicious actor, etc.

In response to determining that the user authorization token is not invalid, the computing server 110 determines 560, based on the user authorization token, whether the user has permissions to perform the action on the data in the data class. The user authorization token includes information on user permissions, including a set of actions the user may perform on data in a data class. In response to determining that the user has permissions to perform the action on the data in the data class, the computing server 110 allows 570 the request from the client device 120.

Computing Machine Architecture

Figure 6:
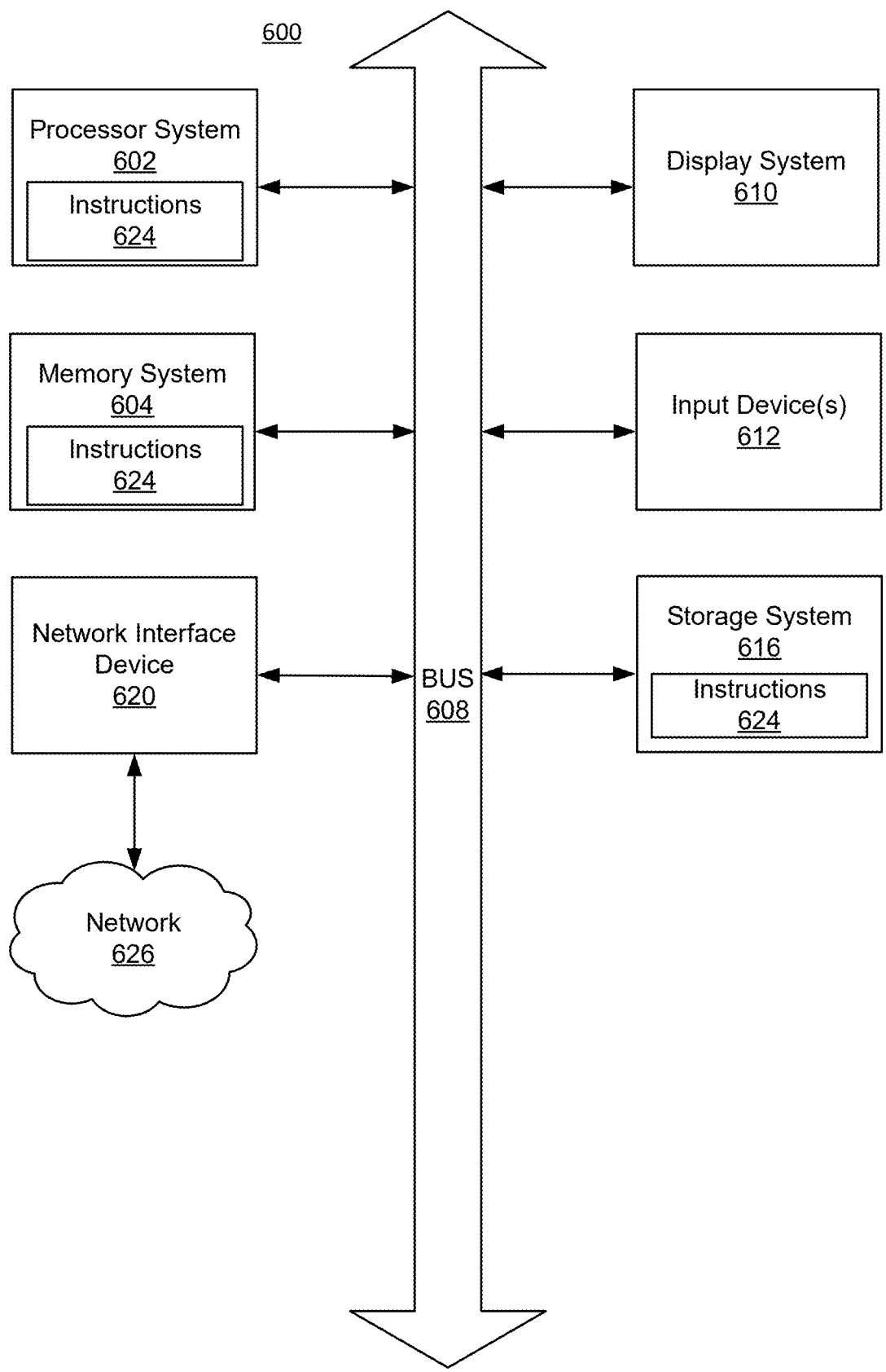
FIG. 6 is a block diagram illustrating components of an example machine able to read instructions from a machine-readable medium and execute them in a processor (or controller), in accordance with some embodiments.

Turning now to FIG. 6, illustrated is an example machine to read and execute computer readable instructions, in accordance with an embodiment. Specifically, FIG. 6 shows a diagrammatic representation of a computing server (and/or data processing system) such as computing server 110, configuration server 130, and/or token generation server 140, in the example form of a computer system 600. The computer system 600 is structured and configured to operate through one or more other systems (or subsystems) as described herein. The computer system 600 can be used to execute instructions 624 (e.g., program code or software) for causing the machine (or some or all of the components thereof) to perform any one or more of the methodologies (or processes) described herein. In executing the instructions, the computer system 600 operates in a specific manner as per the functionality described. The computer system 600 may operate as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The computer system 600 may be a server computer, a client computer, a personal computer (PC), a tablet PC, a smartphone, an internet of things (IoT) appliance, a network router, switch or bridge, or other machine capable of executing instructions 624 (sequential or otherwise) that enable actions as set forth by the instructions 624. Further, while only a single machine is illustrated, the term "machine" shall also be taken to include any collection of machines that individually or jointly execute instructions 624 to perform any one or more of the methodologies discussed herein.

The example computer system 600 includes a processing system 602. The processor system 602 includes one or more processors. The processor system 602 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor system 602 executes an operating system for the computing system 600. The computer system 600 also includes a memory system 604. The memory system 604 may include or more memories (e.g., dynamic random access memory (RAM), static RAM, cache memory). The computer system 600 may include a storage system 616 that includes one or more machine readable storage devices (e.g., magnetic disk drive, optical disk drive, solid state memory disk drive).

The storage system 616 stores instructions 624 (e.g., software) embodying any one or more of the methodologies or functions described herein. For example, the instructions 624 may include instructions for implementing the functionalities of the token validation engine 220 and/or the configuration management engine 230, and the like. The instructions 624 may also reside, completely or at least partially, within the memory system 604 or within the processing system 602 (e.g., within a processor cache memory) during execution thereof by the computer system 600, the main memory 604 and the processor system 602 also constituting machine-readable media. The instructions 624 may be transmitted or received over a network 626, such as the network 626, via the network interface device 620.

The storage system 616 should be taken to include a single medium or multiple media (e.g., a centralized or distributed database, or associated caches and servers communicatively coupled through the network interface device 620) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

In addition, the computer system 600 can include a display system 610. The display system 610 may driver firmware (or code) to enable rendering on one or more visual devices, e.g., drive a plasma display panel (PDP), a liquid crystal display (LCD), or a projector. The computer system 600 also may include one or more input/output systems 612. The input/output (IO) systems 612 may include input devices (e.g., a keyboard, mouse (or trackpad), a pen (or stylus), microphone) or output devices (e.g., a speaker). The computer system 600 also may include a network interface device 620. The network interface device 620 may include one or more network devices that are configured to communicate with an external network 626. The external network 626 may be a wired (e.g., ethernet) or wireless (e.g., WiFi, BLUETOOTH, near field communication (NFC).

The processor system 602, the memory system 604, the storage system 616, the display system 610, the IO systems 612, and the network interface device 620 are communicatively coupled via a computing bus 608.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a non-transitory machine-readable medium and processor executable) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and a process for controlling access to data managed by microservices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for controlling access to data of a data class, the method comprising:
   receiving, by a computer server and from a client device, a request for a user authorization token for a user, the user having a role;
   generating the user authorization token using a configuration file, the configuration file having a first version identifier and specifying, for each of a plurality of roles including the role of the user, permissions describing actions the user has permission to perform on data of a set of data classes, the set of data classes including the data class;
   transmitting the generated user authorization token to the client device, the token including indicia of the first version identifier and permissions corresponding to the role of the user;
   receiving, from the client device, a first request to perform a first action on the data in the data class, the first request including the user authorization token;
   determining whether the user authorization token is invalid by determining whether the user authorization token is expired and whether the first version identifier indicated by the user authorization token is a current version identifier;
   responsive to determining that the user authorization token is not invalid, determining whether the user has permissions to perform the first action on the data in the data class based on the user authorization token;
   responsive to determining that the user has permissions to perform the action on the data in the data class, allowing the request to perform the first action on the data in the data class;
   determining that at least one of the user authorization token or another user authorization token was exposed without authorization;
   updating the configuration file to have a second version identifier that replaces the first version identifier responsive to determining that the at least one of the user authorization token or the other user authorization token was exposed without authorization, the second version identifier different from the first version identifier;
   receiving, from the client device, a second request to perform a second action on the data in the data class, the second request including the user authorization token;
   determining that the user authorization token is invalid because the first version identifier indicated in the user authorization token is different from the second version identifier of the configuration file; and
   denying the request to perform the second action on the data in the data class responsive to determining that the user authorization token is invalid.

2. The method of claim 1, wherein the received request is a first request to perform a first action on the data in the data class, and the method further comprising:
   caching the user authorization token that is included in the first request;
   receiving, from the client device, a second request to perform a second action on the data in the data class, the second request including the user authorization token;
   extracting the user authorization token included in the second request;
   determining that the user authorization token included in the second request is already stored in the cache of the computer server; and
   responsive to determining that the user authorization token included in the second request is already stored in the cache of the computer server, automatically allowing the request to perform the second action on the data in the data class.

3. The method of claim 1, wherein determining whether the user authorization token is invalid comprises determining whether a format of the user authorization token is invalid.

4. The method of claim 1, further comprising, responsive to determining that the user authorization token is invalid, disallowing the request to perform the action on data in the data class.

5. The method of claim 1, further comprising, responsive to determining that the user does not have permissions to perform the action on the data in the data class, disallowing the request to perform the action on data in the data class.

6. The method of claim 1, wherein generating the user authorization token using a configuration file further comprises generating the user authorization token using a user state.

7. The method of claim 1, wherein the configuration file is stored in a configuration server and further comprising accessing the configuration file from the configuration server.

8. A non-transitory computer readable storage medium comprising stored program code, the program code comprising instructions that, when executed, cause a processor system to:
   receive, by a computer server and from a client device, a request for a user authorization token for a user, the user having a role;
   generate the user authorization token using a configuration file, the configuration file having a first version identifier and specifying, for each of a plurality of roles including the role of the user, permissions describing actions the user has permission to perform on data of a set of data classes, the set of data classes including the data class;
   transmit the generated user authorization token to the client device, the token including indicia of the first version identifier and permissions corresponding to the role of the user;
   receive, from the client device, a first request to perform a first action on the data in the data class, the first request including the user authorization token;

determine whether the user authorization token is invalid by determining whether the user authorization token is expired and whether the first version identifier indicated by the user authorization token is a current version identifier;

responsive to the determination that the user authorization token is not invalid, determine whether the user has permissions to perform the first action on the data in the data class based on the user authorization token;

responsive to the determination that the user has permissions to perform the action on the data in the data class, allow the request to perform the first action on the data in the data class;

determine that at least one of the user authorization token or another user authorization token was exposed without authorization;

update the configuration file to have a second version identifier that replaces the first version identifier responsive to determining that the at least one of the user authorization token or the other user authorization token was exposed without authorization, the second version identifier different from the first version identifier;

receive, from the client device, a second request to perform a second action on the data in the data class, the second request including the user authorization token;

determine that the user authorization token is invalid because the first version identifier indicated in the user authorization token is different from the second version identifier of the configuration file; and deny the request to perform the second action on the data in the data class responsive to determining that the user authorization token is invalid.

9. The non-transitory computer readable storage medium of claim 8, wherein the received request is a first request to perform a first action on the data in the data class and wherein the instructions further comprise instructions that when executed cause the processor system to:

cache the user authorization token that is included in the first request;

receive, from the client device, a second request to perform a second action on the data in the data class, the second request including the user authorization token;

extract the user authorization token included in the second request;

determine that the user authorization token included in the second request is already stored in the cache of the computer server; and responsive to determining that the user authorization token included in the second request is already stored in the cache of the computer server, automatically allow the request to perform the second action on the data in the data class.

10. The non-transitory computer readable storage medium of claim 8, wherein the instructions to determine whether the user authorization token is invalid comprise instructions that when executed cause the processor system to determine whether a format of the user authorization token is invalid.

11. The non-transitory computer readable storage medium of claim 8, wherein the instructions further comprise instructions that when executed cause the processor system to, responsive to the determination that the user authorization token is invalid, disallow the request to perform the action on data in the data class.

12. The non-transitory computer readable storage medium of claim 8, wherein the instructions further comprise instructions that when executed cause the processor system to, responsive to the determination that the user does not have permissions to perform the action on the data in the data class, disallow the request to perform the action on data in the data class.

13. The non-transitory computer readable storage medium of claim 8, wherein the instructions to generate the user authorization token using a configuration file further comprise instructions that when executed cause the processor system to generate the user authorization token using a user state.

14. The non-transitory computer readable storage medium of claim 8, wherein the configuration file is stored in a configuration server and wherein the instructions further comprising instructions that when executed cause the processor system to access the configuration file from the configuration server.

15. A computer system, comprising:
a processor system comprising at least one computer processor; and
a non-transitory computer readable storage medium comprising stored program code, the program code comprising instructions, the instructions when executed causes the processor system to:

receive, by a computer server and from a client device, a request for a user authorization token for a user, the user having a role;

generate the user authorization token using a configuration file, the configuration file having a first version identifier and specifying, for each of a plurality of roles including the role of the user, permissions describing actions the user has permission to perform on data of a set of data classes, the set of data classes including the data class;

transmit the generated user authorization token to the client device, the token including indicia of the first version identifier and permissions corresponding to the role of the user;

receive, from the client device, a first request to perform a first action on the data in the data class, the first request including the user authorization token;

determine whether the user authorization token is invalid by determining whether the user authorization token is expired and whether the first version identifier indicated by the user authorization token is a current version identifier;

responsive to the determination that the user authorization token is not invalid, determine whether the user has permissions to perform the first action on the data in the data class based on the user authorization token;

responsive to the determination that the user has permissions to perform the action on the data in the data class, allow the request to perform the first action on the data in the data class;

determine that at least one of the user authorization token or another user authorization token was exposed without authorization;

update the configuration file to have a second version identifier that replaces the first version identifier responsive to determining that the at least one of the user authorization token or the other user authorization token was exposed without authorization, the second version identifier different from the first version identifier;

receive, from the client device, a second request to perform a second action on the data in the data class, the second request including the user authorization token;

determine that the user authorization token is invalid because the first version identifier indicated in the user authorization token is different from the second version identifier of the configuration file; and deny the request to perform the second action on the data in the data class responsive to determining that the user authorization token is invalid.

16. The system of claim 15, wherein the received request is a first request to perform a first action on the data in the data class and wherein the instructions further comprise instructions that when executed cause the processor system to:

cache the user authorization token that is included in the first request;

receive, from the client device, a second request to perform a second action on the data in the data class, the second request including the user authorization token;

extract the user authorization token included in the second request;

determine that the user authorization token included in the second request is already stored in the cache of the computer server; and responsive to determining that the user authorization token included in the second request is already stored in the cache of the computer server, automatically allow the request to perform the second action on the data in the data class.

17. The system of claim 15, wherein the instructions to determine whether the user authorization token is invalid comprise instructions that when executed cause the processor system to determine whether a format of the user authorization token is invalid.

18. The system of claim 15, wherein the instructions further comprise instructions that when executed cause the processor system to, responsive to the determination that the user authorization token is invalid, disallow the request to perform the action on data in the data class.

* * * * *